United States Patent
Lynk et al.

(10) Patent No.: US 11,427,108 B2
(45) Date of Patent: Aug. 30, 2022

(54) METHOD FOR OPERATING A FUEL CELL SYSTEM FOR A MOTOR VEHICLE

(71) Applicants: NIKOLA CORPORATION, Phoenix, AZ (US); ROBERT BOSCH GMBH, Stuttgart-Feuerbach (DE)

(72) Inventors: Kevin Lynk, Phoenix, AZ (US); Jesse Schneider, Chandler, AZ (US); Arpad Imre, Vaihingen (DE); Werner Belschner, Michelbach An der Bilz (DE); Peter Eckert, Bretzfeld (DE); Jorg Heyse, Besigheim (DE)

(73) Assignees: Nikola Corporation, Phoenix, AZ (US); Robert Bosch GmbH, Stuttgart-Feuerbach (DE)

( * ) Notice: Subject to any disclaimer, the term of this patent is extended or adjusted under 35 U.S.C. 154(b) by 225 days.

(21) Appl. No.: 16/917,477

(22) Filed: Jun. 30, 2020

(65) Prior Publication Data

US 2020/0331361 A1    Oct. 22, 2020

Related U.S. Application Data

(63) Continuation of application No. PCT/IB2019/057250, filed on Aug. 28, 2019.

(30) Foreign Application Priority Data

Aug. 29, 2018  (DE) ...................... 10 2018 214 643.8

(51) Int. Cl.
    *B60L 58/33*    (2019.01)
    *B60L 58/34*    (2019.01)
    (Continued)

(52) U.S. Cl.
    CPC .............. *B60L 58/33* (2019.02); *B60H 1/143* (2013.01); *B60L 58/34* (2019.02);
    (Continued)

(58) Field of Classification Search
    CPC ...... B60L 58/33; B60L 58/34; B60L 2240/36; B60H 1/143; H01M 8/04029; H01M 8/04723
    See application file for complete search history.

(56) References Cited

U.S. PATENT DOCUMENTS

2007/0204984 A1*  9/2007  Limbeck ........... H01M 8/04723
                                                                165/42
2010/0297515 A1  11/2010  Erikstrup et al.
(Continued)

FOREIGN PATENT DOCUMENTS

DE          10107559       8/2002
DE        102009028648     2/2011
(Continued)

OTHER PUBLICATIONS

English machine translation of Bauer (DE 102010007857 A1) (Year: 2011).*

(Continued)

*Primary Examiner* — Sarah A. Slifka
*Assistant Examiner* — Aaron J Salter
(74) *Attorney, Agent, or Firm* — Snell & Wilmer L.L.P.

(57) ABSTRACT

The invention relates to a method for operating a fuel cell system (10) using a first operating mode, in which, when all of the fuel cell stacks (22, 26) are inactive, one fuel cell stack (22) is pre-heated using a coolant that is pre-heated by means of an electric heater (42) while bypassing all cooler circuits (58) of the active coolant circuits (14) via bypass lines (64) and the one pre-heated fuel cell stack (22) is activated in order to pre-heat an additional fuel cell stack (26) of the fuel cell system. Other operating modes for operating a fuel cell system are disclosed in additional embodiments.

11 Claims, 3 Drawing Sheets

(51) Int. Cl.
*B60H 1/14* (2006.01)
*H01M 8/04029* (2016.01)
*H01M 8/04701* (2016.01)

(52) U.S. Cl.
CPC ... *H01M 8/04029* (2013.01); *H01M 8/04723* (2013.01); *B60L 2240/36* (2013.01)

(56) References Cited

U.S. PATENT DOCUMENTS

2013/0022888 A1* 1/2013 Vollmer ............ H01M 8/04067
429/434
2015/0017559 A1* 1/2015 Klewer ............. H01M 8/04067
429/435
2017/0365901 A1 12/2017 Hiramitsu et al.

FOREIGN PATENT DOCUMENTS

| DE | 102010007857 A1 * | 8/2011 | ......... H01M 16/006 |
|---|---|---|---|
| DE | 102012007382 | 10/2013 | |
| DE | 102015225650 A1 * | 6/2017 | |
| DE | 102016115789 | 3/2018 | |
| EP | 2254182 | 8/2012 | |
| JP | 2006302746 A * | 11/2006 | |
| JP | 2016031841 | 3/2016 | |

OTHER PUBLICATIONS

English machine translation of Baumann et al. (DE 102015225650 A1) (Year: 2017).*
English machine translation of So (JP 2006302746 A) (Year: 2006).*
ISA; International Preliminary Report on Patentability dated Mar. 2, 2021 in PCT/IB2019/057250.
EPO; Decision to Grant European Patent dated Jun. 17, 2021 in EP 19783642.2.
PCT; International Search Report and Written Opinion in the PCT Application PCTIB2019057250 dated Dec. 17, 2019.

* cited by examiner

METHOD FOR OPERATING A FUEL CELL SYSTEM FOR A MOTOR VEHICLE

CROSS-REFERENCE TO RELATED APPLICATIONS

This application is a continuation of PCT Application No. PCT/IB2019/057250 filed Aug. 28, 2019 and entitled "METHOD FOR OPERATING A FUEL CELL SYSTEM FOR A MOTOR VEHICLE." PCT Application No. PCT/IB2019/057250 claims priority to and the benefit of German Application No. DE 10 2018 214 643.8 filed on Aug. 29, 2018 and entitled "COOLING SYSTEM FOR FUEL CELL STACKS." The entirety of each of the foregoing applications are incorporated herein by reference for all purposes (except for any subject matter disclaimers or disavowals, and except to the extent of any conflict with the disclosure of the present application, in which case the disclosure of the present application shall control).

TECHNICAL FIELD

The invention relates to a method for operating a fuel cell system for a motor vehicle.

BACKGROUND

In fuel cell systems, oxygen from the environment is typically used as the oxidant to react with hydrogen in the fuel cell to become water and thus to provide electrical power through electrochemical conversion. During this process, the fuel cell produces extra thermal energy, which has to be discharged via a cooling system.

Prior Art

A tempering device for tempering a fuel cell stack is known from EP 2 287 952 B 1.

The underlying idea of the invention is that a fuel cell must be operated at a specific, as much as possible constant, operating temperature to achieve a particularly good efficiency for the fuel cell. The operating temperature is dependent on the type of fuel cell. If the fuel cell overheats, the output of the fuel cell must be limited. Therefore, sufficient cooling during operation is important. On the other hand, if the fuel cell starts operation at low temperatures, which is called a cold start, the fuel cell will only deliver a low output, since the electrochemical reaction and thus the voltage of the fuel cell are strongly temperature-dependent. Therefore, the temperature of the fuel cell must be increased fast upon cold starting.

It is therefore the object of the present invention to provide a method for operating a fuel cell system for a motor vehicle with which the fuel cell system can be operated in an energy efficient and economical manner.

DETAILED DESCRIPTION

Figure 1A:
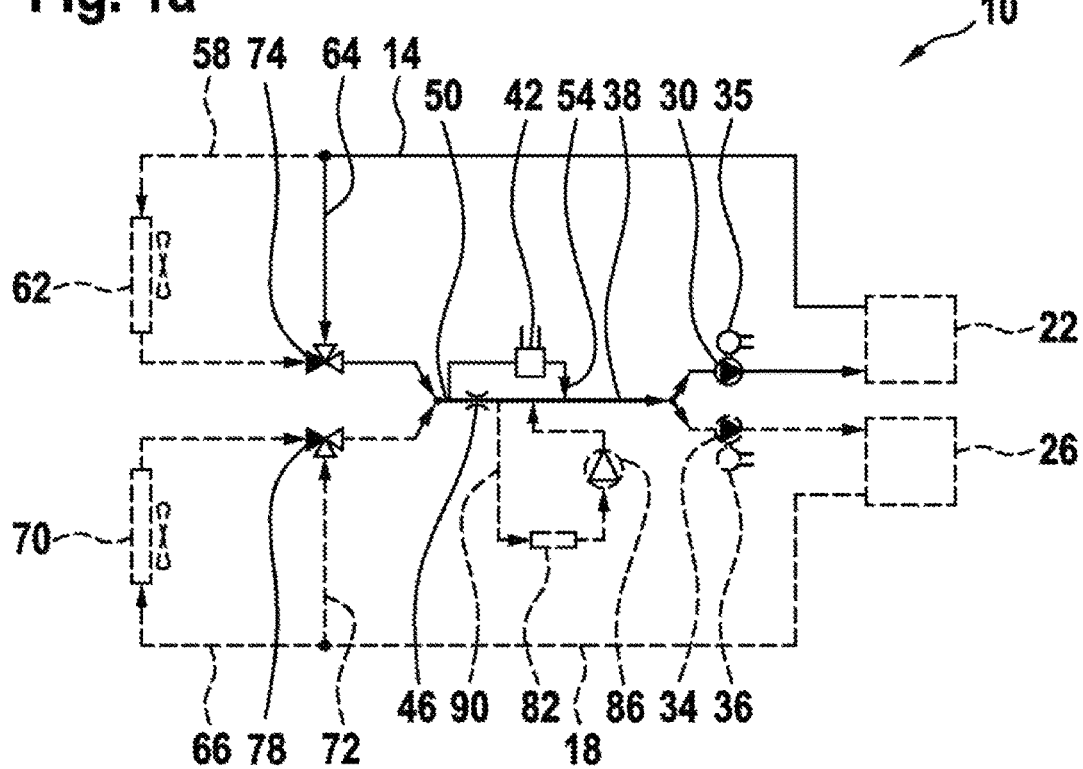
FIG. 1A illustrates a representation of a first process step of a first operating mode for operating a fuel cell system according to an exemplary embodiment of the invention.

This object is solved by a method for operating a fuel cell system for a motor vehicle having the features according to claim 1. The respective dependent claims referring back to claim 1 reflect advantageous further developed embodiments of the invention.

The invention provides a method for operating a fuel cell system for a motor vehicle, wherein the fuel cell system has at least two fuel cell stacks and the method comprises at least four operating modes. The method comprises a first operating mode, in which, when all of the fuel cell stacks are inactive, at least one coolant circuit of the fuel cell system, which coolant circuit comprises at least one fuel cell stack, is pre-heated using a coolant that is pre-heated by means of an electric heater, while bypassing all cooler circuits of the active coolant circuits via bypass lines and the at least one preheated fuel cell stack is activated in a next step in order to pre-heat at least one additional coolant circuit of the fuel cell system, which coolant circuit comprises at least one fuel cell stack, a second operating mode, in which all of the coolant circuits are operated and at least one fuel cell stack is inactive, wherein the cooler circuits are actively operated for all of the fuel cell stacks being actively operated, and additionally the bypass of at least one cooler circuit via the bypass line of the at least one inactive fuel cell stack is at least reduced, a third operating mode, in which at least two fuel cell stacks and the cooler circuits of all of the fuel cell stacks are actively operated during the operation of all of the coolant circuits, and a fourth operating mode, in which, when at least one fuel cell stack is inactive, the corresponding cooler circuit is bypassed via the bypass line and all of the coolant circuits of the fuel cell system are active, such that the inactive fuel cell stacks are kept warm via the active fuel cell stacks.

A cooler circuit in the meaning of the invention is a line section of the coolant circuit which only comprises a cooler. This line section can be bypassed by a bypass line of the coolant circuit, such that no coolant or a reduced coolant amount is conducted through the cooler. Inactivity of a fuel cell stack means that this fuel cell stack is not operated or not supplied with fuel, respectively. Accordingly, if a fuel cell stack is actively operated, it will be supplied with fuel.

The method for operating the fuel cell system has the advantage that energy of an electric heater can be saved by heating up another fuel cell stack via the waste heat from an active fuel cell stack. This allows a more energy efficient and economical operation of the system. The potential use of all existing coolers for cooling the coolant allows a smaller dimensioning of each cooler and/or reduction of the fan output required for cooling, which makes the system more efficient. The option of passing flow through the inactive fuel cell stacks also reduces the required cooler output by heating up the fuel cell stacks or keeping them warm. The method has the additional advantage that a majority of components can be used jointly, despite considerable freedom of conducting the process. This increases the efficiency of such a system.

In a preferred embodiment of the invention, the coolant is additionally used to heat an interior of the motor vehicle. To this end, the coolant is conducted through a heat exchanger, thereby heating an air that is supplied to the interior. This makes it possible to quickly bring the interior to a pleasant temperature. In addition, costs for an interior electric heater can be saved. Heating the interior also has a cooling effect on the coolant.

Advantageously, the cooling medium is fed to an interior heat exchanger via an interior heat exchanger pump. This ensures a supply to the interior heat exchanger. In addition, the flow rate and thus the thermal energy needed for the interior heat exchanger can be adjusted by controlling the pump output. In addition, the interior heat exchanger can be operated separately from an operation of the coolant circuit.

In a preferred further developed embodiment of the invention, the method comprises an operating mode in which, when all coolant circuits, all fuel cell stacks, and all cooler circuits are inactive, the coolant is heated by means of the electric heater and the heat is delivered via the interior heat exchanger. In this operating mode, the interior can also be heated when the coolant circuits are inactive. This operating mode is particularly interesting for heating the interior when the motor vehicle is not operated. This would let a driver sleep in the vehicle at a sufficient temperature.

In another preferred embodiment of the invention, all cooler circuits of the inactive fuel cell stacks are activated in the second operating mode. This will reach the maximum cooling capacity of the fuel cell system. Using all coolers increases the cooling surface area, which allows the system to save energy for operating the cooler fans. In addition, it is prevented that the fuel cell stack output is adjusted downward to protect it from overheating.

It is preferred that the cooler circuit of the inactive fuel cell stacks is at least partially bypassed via the bypass line in the second operating mode. The cooler circuit can preferably be bypassed at least partially via the bypass line. This reduces or adjusts the cooling output such that overcooling of the fuel cell system is prevented.

Advantageously, the coolant is electrically pre-heated using a positive temperature coefficient (PTC) heater. PTC heaters have the advantage that they heat up to a specific temperature only, then the power draw is automatically reduced. In comparison, other technologies need closed-loop control, since their heating elements are not self-regulating. No control is needed here.

In a preferred embodiment, a single coolant circuit is actively operated in the first operating mode, such that a single fuel cell stack is electrically pre-heated. This has the advantage that this fuel cell stack is heated up faster, such that the waste heat from this fuel cell stack can faster be used to heat up the remaining fuel cell stacks.

In an advantageous embodiment, a bypassing or reduction of the throughput of the cooler circuits via the bypass lines is activated by means of valves. Preferably, reversing valves are used, 3/2-way reversing valves being particularly preferred. The coolant flow can be conducted by means of valves. Respective control of the valves can for example allow to bypass a cooling circuit with the respective cooler, such that a cooling output is reduced.

It is preferred that all coolant circuits are combined into a joint collecting line. A collecting line is a line into which coolant is introduced from various sources and transported further. After all the coolant has been introduced into the collecting line, the coolant is conducted to the various fuel cell stacks. In this way, the coolant can be distributed to all fuel cell stacks. In addition, the temperature of the coolant in the various coolant circuits is harmonized by intermixing in the collection line, such that the cooling capacity of all coolers and the waste heat of all fuel cell stacks can be utilized. Furthermore, components needed for all fuel cell stacks, such as the electric heater, can be used for all fuel cell stacks due to an arrangement in the collection line. This increases the efficiency of the system.

The coolant circuits are preferably operated by coolant pumps. A respective coolant pump of a coolant circuit can be used to specify an operation or non-operation of the coolant circuit. The coolant pumps can also be controlled for a controllable volumetric flow.

In an advantageous further developed embodiment of the invention, the coolant pump of at least one inactive fuel cell stack is operated at a lower driving power. A lower driving power, as used herein, includes a driving power that equals zero. This reduces the flow of coolant through this coolant circuit. A cooling power of the coolant circuit associated with the inactive fuel cell stack is thus reduced. In spite of that, the inactive fuel cell stack can be kept at an operating temperature. In addition, pump driving energy can be saved.

The invention also includes a device which is adapted to perform the method according to the invention. In this way, the advantages mentioned for the method can be achieved.

Furthermore, the invention includes a motor vehicle which comprises such a device.

Exemplary embodiments of the invention are shown in the drawings and explained in more detail in the description below.

FIG. 1A shows a representation of a first process step of a first operating mode for operating a fuel cell system 10 according to an exemplary embodiment of the invention. This exemplary embodiment shows an example of the first process step of the first operating mode based on a first and a second coolant circuit 14, 18. Coolant can be supplied via the first and second coolant circuits 14, 18 to a first and a second fuel cell stack 22, 26 by means of a first coolant pump 30 associated with the first fuel cell stack 22 and a second coolant pump 34 associated with the second fuel cell stack 26. The first coolant pump 30 is driven via a first coolant pump motor 35 and the second coolant pump 34 is driven via a second coolant pump motor 36.

In this first process step, coolant is supplied to the first fuel cell stack 22 via the first coolant pump 30 when all fuel cell stacks 22, 26 as well as the second coolant pump 34 are inactive and thus the second coolant circuit 18 is active. This coolant is heated up using an electric heater 42 disposed in the collecting line 38, which heater is in this case a PCT heater. A defined flow rate of the PCT heater 42 is ensured by a throttle 46, which is disposed between a heater branch 50 and a heater inlet 54 in the collecting line 38.

To accelerate the pre-heating of the first fuel cell stack 22, a first cooler 62 disposed in the first cooler circuit 58 is bypassed by a first bypass line 64, such that the first cooler circuit 58 is inactive. In analogy to the first cooler circuit 58, the second coolant circuit 18 has a second cooler circuit 66 with a second cooler 70, wherein the second cooler circuit 66 can be bypassed via a second bypass line 72, such that the second cooler circuit 66 is inactive. A bypass of the cooler circuits 58, 66 is achieved by respective switching of the first and second valves 74, 78, which in this case are configured as 3/2-way reversing valves. During this phase, an interior heat exchanger 82, which heats up an interior of a motor vehicle, can be active or inactive. The interior heat exchanger 82 is inactive in FIG. 1a, such that faster heating up of the first fuel cell stack 22 is achieved.

Figure 1B:
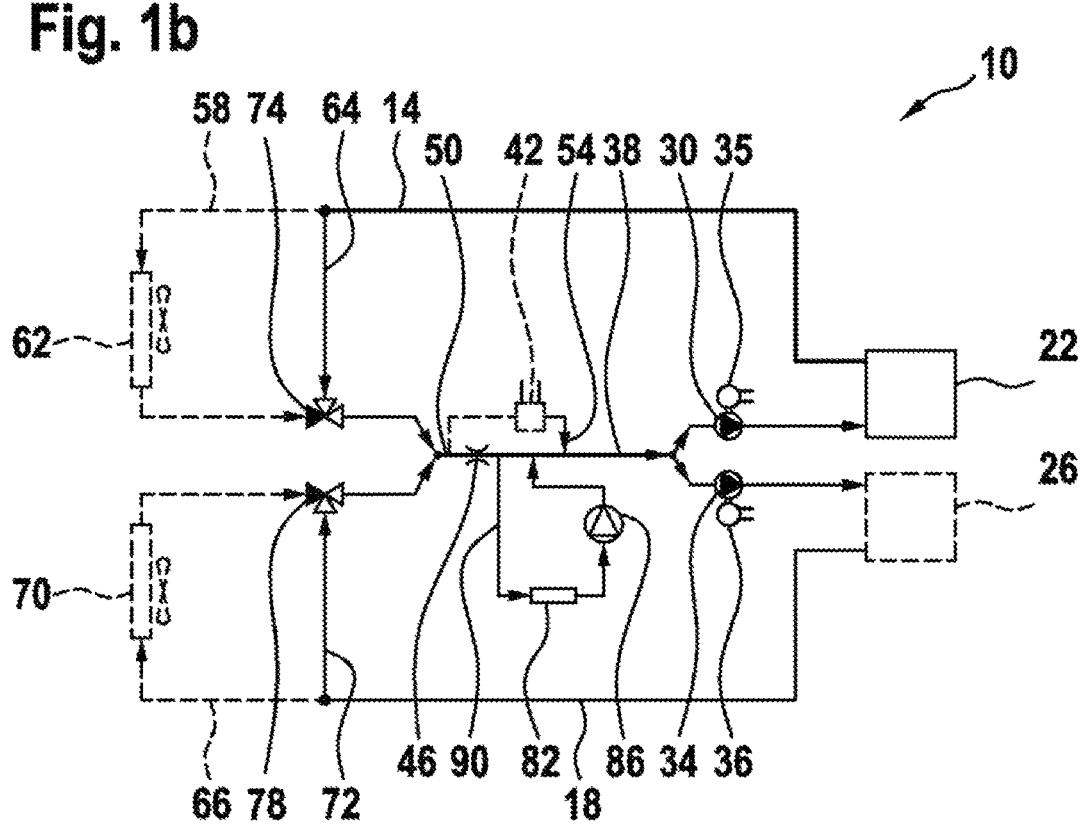
FIG. 1B illustrates a representation of a second process step of the first operating mode for operating a fuel cell system according to an exemplary embodiment of the invention.

FIG. 1B shows a representation of a second process step of the first operating mode for operating a fuel cell system 10 according to an exemplary embodiment of the invention. In this process step, the first fuel cell stack 22 is activated after reaching a required minimum starting temperature. The PTC heater 42 is deactivated in the process to save energy. In addition to the process step shown in FIG. 1A, the second coolant pump 34 is activated, such that the second inactive fuel cell stack 26 is pre-heated and brought to operating temperature through the waste heat from the first fuel cell stack 22.

To accelerate the heating up of the second fuel cell stack 26, the second cooler circuit 66 is bypassed in addition to the first cooler circuit 58 via the second bypass line 72 in this second process step of the first operating mode. In the second process step, the interior heat exchanger 82 may additionally be active. As an example, the interior heat exchanger 82 is shown active in the FIG. 1b shown here. To this end, an interior heat exchanger pump 86 associated to the interior heat exchanger 82 is operated in an interior heat exchanger circuit 90 to pump the coolant through the interior heat exchanger 82.

Figure 2:
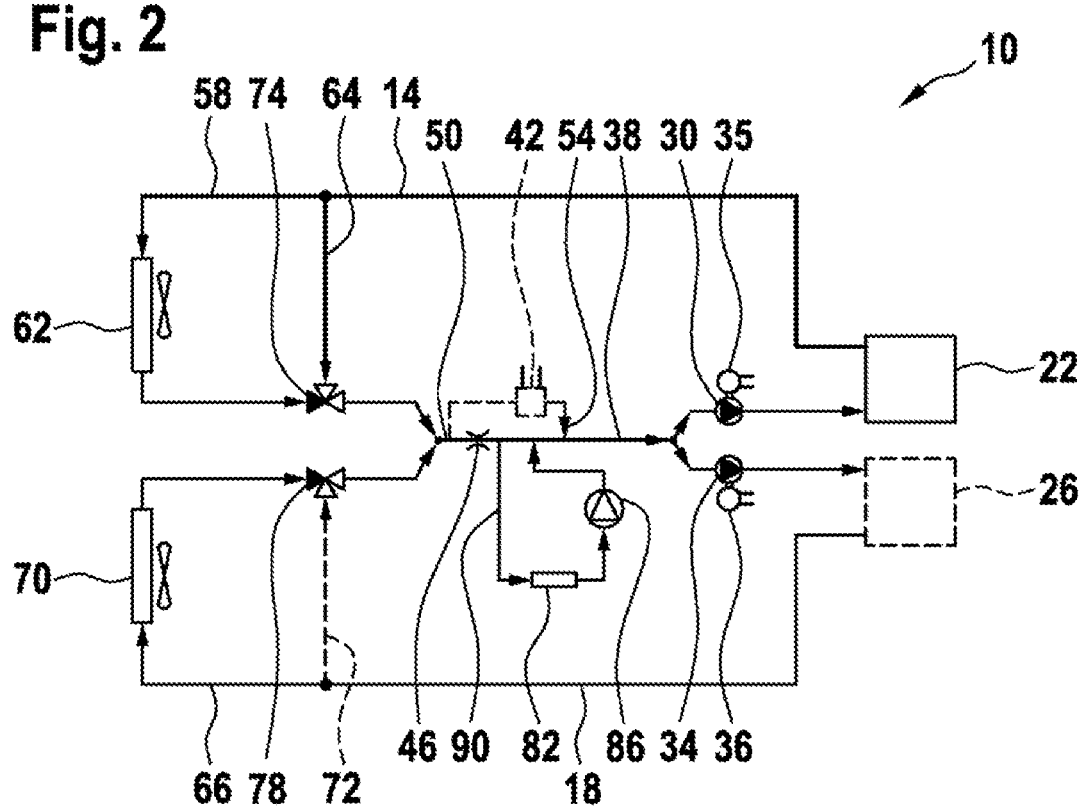
FIG. 2 illustrates a representation of a second operating mode for operating a fuel cell system according to an exemplary embodiment of the invention.

FIG. 2 shows a representation of a second operating mode for operating a fuel cell system 10 according to an exemplary embodiment of the invention. In this operating mode, the first fuel cell stack 22 is active while the second fuel cell stack 26 is inactive. The coolant is pumped through both coolant circuits 14, 18 by the operation of both coolant pumps 30, 34. In this process, there is a flow through the second inactive fuel cell stack 26 as well and keeps it warm.

In the second operating mode, the second 3/2-way reversing valve 78 is switched in addition to the first 3/2-way reversing valve 74 of the first and second coolant circuits 14, 18 in such a manner that coolant flows through the first and second coolers 62, 70. This allows achieving a better cooling output during the second operating mode. The PTC heater 42 is inactive during the second operating mode to avoid unnecessary heating up of the coolant and to save energy. The interior heat exchanger 82 is as an example shown active in this operating mode as well.

Figure 3:
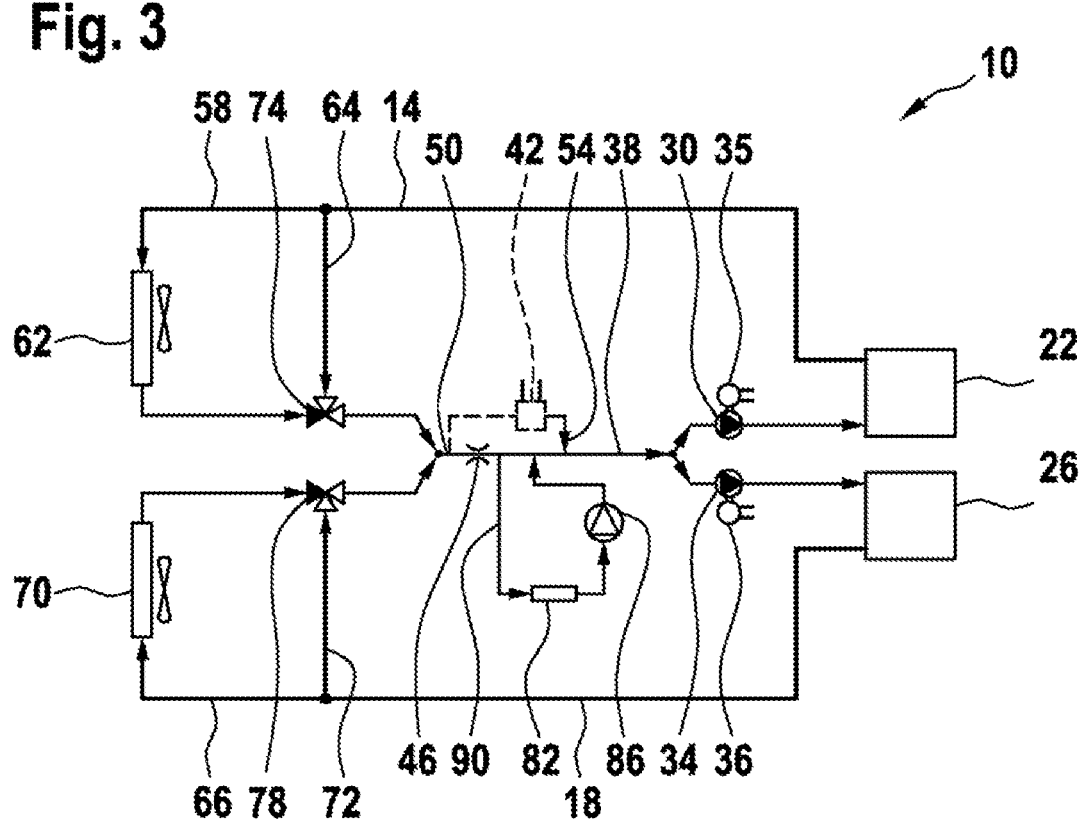
FIG. 3 illustrates a representation of a third operating mode for operating a fuel cell system according to an exemplary embodiment of the invention.

FIG. 3 shows a representation of a third operating mode for operating a fuel cell system 10 according to an exemplary embodiment of the invention. In this operating mode, the first and second fuel cell stacks 22, 26 are active. The waste heat produced by the fuel cell stacks 22, 26 is dissipated via both coolers 62, 70. Like in the second operating mode, the PCT heater 42 is inactive in the third operating mode as well.

Figure 4:
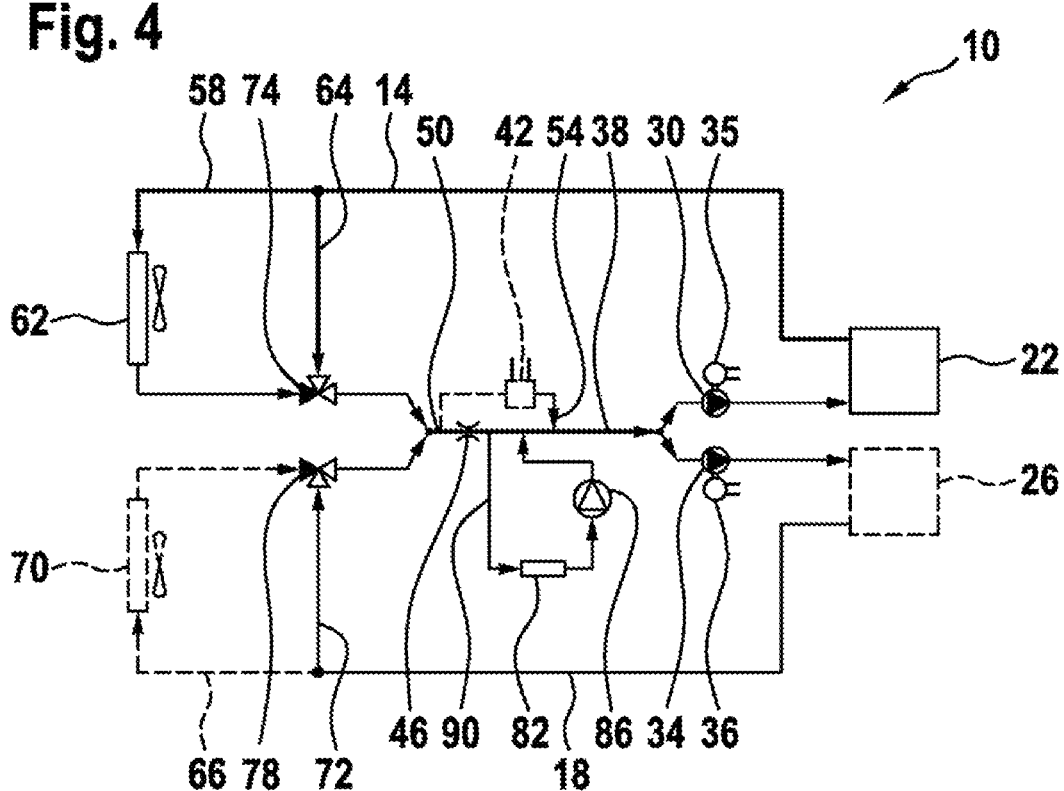
FIG. 4 illustrates a representation of a fourth operating mode for operating a fuel cell system according to an exemplary embodiment of the invention.

FIG. 4 shows a representation of a fourth operating mode for operating a fuel cell system 10 according to an exemplary embodiment of the invention. In this operating mode, the second fuel cell stack 26 and the second cooler 70 are inactive. The latter reduces the cooling output, such that a sufficient temperature can be ensured in the coolant circuits 14, 18 if there is a risk of cooling due to, for example, low outside temperatures and airflow. In addition, coolant flows through the second fuel cell stack 26, such that this stack can be kept at operating temperature.

Figure 5:
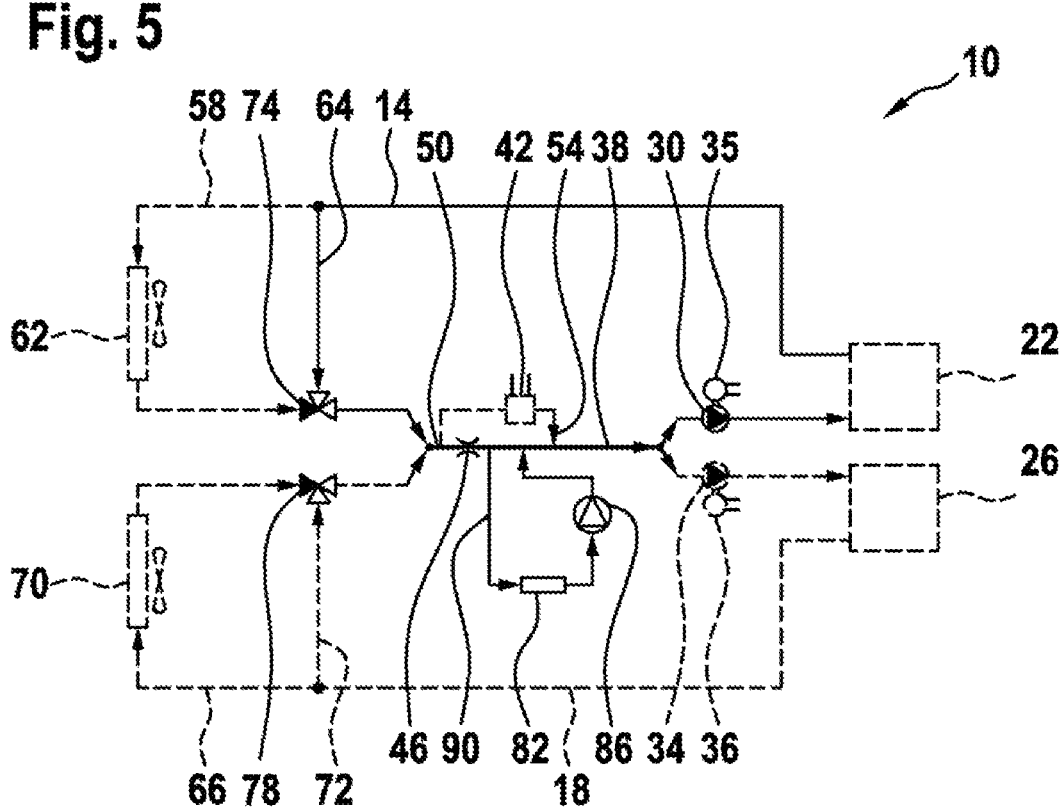
FIG. 5 illustrates a representation of the first process step of the first operating mode for operating a fuel cell system according to the exemplary embodiment shown in FIG. 1a, wherein, in addition, a heating of an interior of the motor vehicle is used.

FIG. 5 shows a representation of the first process step of the first operating mode for operating a fuel cell system 10 according to the exemplary embodiment shown in FIG. 1a, wherein, in addition, a heating of an interior of the motor vehicle is used. In this operating mode, the interior heat exchanger 82 of the motor vehicle is used although both fuel cell stacks 22, 26 are inactive. While this prolongs the heating time of the first fuel cell stack 22, the interior can be heated at the same time.

In another operating mode for operating a fuel cell system 10 according to another exemplary embodiment of the invention not shown herein, the first coolant circuit 14 and thus the first coolant pump 30 are additionally inactive or not operated, unlike the exemplary embodiment shown in FIG. 5. A circuit of the coolant is generated via the interior heat exchanger pump 86 between the PTC heater 42 and the interior heat exchanger 82, such that only the interior is heated electrically.

LIST OF REFERENCE NUMERALS 10 fuel cell system
14 first coolant circuit
18 second coolant circuit
22 first fuel cell stack
26 second fuel cell stack
30 first coolant pump
34 second coolant pump
35 first coolant pump motor
36 second coolant pump motor
38 collecting line
42 electric heater
46 throttle
50 heater branch-off
54 heater inlet
58 first cooler circuit
62 first cooler
64 first bypass line
66 second cooler circuit
70 second cooler
72 second bypass line
74 first valve
78 second valve
82 interior heat exchanger
86 interior heat exchanger pump
90 interior heat exchanger circuit

What is claimed is:

1. A method for operating a fuel cell system for a motor vehicle, the fuel cell system comprising a first coolant circuit comprising a first fuel cell stack, a first cooler circuit, and a first cooler, and a second coolant circuit comprising a second fuel cell stack, a second cooler circuit, and a second cooler, the first cooling circuit and the second cooling circuit sharing a joint collecting line, the method comprising:
   operating the fuel cell system in a first phase of a first operating mode, wherein, in the first phase of the first operating mode the first coolant circuit supplies coolant to the first fuel cell stack, the first fuel cell stack is inactive, the first cooler circuit is bypassed via a first bypass line, and the second fuel cell stack is inactive;
   operating the fuel cell system in a second phase of the first operating mode, wherein, in the second phase of the first operating mode the first coolant circuit supplies coolant to the first fuel cell stack, the first fuel cell stack is active, the first cooler circuit is bypassed via the first bypass line, the second coolant circuit supplies coolant to the second fuel cell stack, the second fuel cell stack is inactive, and the second cooler circuit is bypassed via a second bypass line;
   operating the fuel cell system in a second operating mode, wherein, in the second operating mode coolant is conducted through the first cooler of the first coolant circuit and supplied to the first fuel cell stack, the first fuel cell stack is active, coolant is conducted through the second cooler of the second coolant circuit and supplied to the second fuel cell stack, and the second fuel cell stack in inactive;

operating the fuel cell system in a third operating mode, wherein, in the third operating mode coolant is conducted through the first cooler of the first coolant circuit and supplied to the first fuel cell stack, the first fuel cell stack is active, coolant is conducted through the second cooler of the second coolant circuit and supplied to the second fuel cell stack, and the second fuel cell stack is active; and operating the fuel cell system in a fourth operating mode, wherein, in the fourth operating mode coolant is conducted through the first cooler of the first coolant circuit and supplied to the first fuel cell stack, the first fuel cell stack is active, the second coolant circuit supplies coolant to the second fuel cell stack, the second fuel cell stack is inactive, and the second cooler circuit is bypassed via the second bypass line.

2. The method of claim 1, wherein the first coolant circuit is preheated using an electric heater in the first phase of the first operating mode.

3. The method of claim 1, wherein the second coolant circuit is preheated using the first fuel cell stack in the second phase of the first operating mode.

4. The method of claim 1, wherein a heat exchanger is inactive in the first phase of the first operating mode.

5. The method of claim 1, wherein a heat exchanger is active in the second phase of the first operating mode, the second operating mode, the third operating mode, and the fourth operating mode.

6. The method of claim 1, further comprising heating an interior of the motor vehicle during the first phase of the first operating mode.

7. The method of claim 1, wherein the first coolant circuit supplies coolant to the first fuel cell stack via a first coolant pump operated by a first coolant pump motor.

8. The method of claim 2, wherein the electric heater is a positive temperature coefficient (PTC) heater.

9. The method of claim 1, wherein the first cooler circuit and the second cooler circuit are bypassed using valves.

10. The method of claim 9, wherein the valves are 3/2-way reversing valves.

11. The method of claim 1, wherein the first coolant circuit and the second coolant circuit are operated by coolant pumps.

* * * * *